United States Patent [19]

Nose

[11] Patent Number: 4,646,532
[45] Date of Patent: Mar. 3, 1987

[54] EXPANSION VALVE

[75] Inventor: Toshimitsu Nose, Atsugi, Japan

[73] Assignee: Nissan Motor Co., Ltd., Yokohama, Japan

[21] Appl. No.: 781,417

[22] Filed: Sep. 30, 1985

[30] Foreign Application Priority Data

Oct. 26, 1984 [JP] Japan .................. 59-224130

[51] Int. Cl.⁴ .......................................... F25B 41/04
[52] U.S. Cl. ..................... 62/212; 62/225; 236/92 B
[58] Field of Search ............... 236/92 B; 62/225, 224, 62/223, 222, 210, 211, 212; 251/129.03

[56] References Cited

U.S. PATENT DOCUMENTS

| | | | |
|---|---|---|---|
| 2,019,724 | 11/1935 | Otto | 62/225 X |
| 2,095,834 | 10/1937 | Rodman | 62/223 X |
| 2,297,872 | 10/1942 | Carter et al. | 62/211 X |
| 2,319,993 | 5/1943 | Kaufman | 62/211 |

Primary Examiner—Harry Tanner
Attorney, Agent, or Firm—Schwartz, Jeffery, Schwaab, Mack, Blumenthal & Evans

[57] ABSTRACT

An expansion valve having a pressure chamber for changing its inside pressure, an expansion chamber provided with an orifice at a hole formed between a primary path and a secondary path, and a valve member provided within the expansion chamber, the position of the valve member being normally biased by one end of a spring in the direction of closing the orifice, in which the expansion valve further comprises an actuator having a solenoid, a rod coupled to the spring, and an action plate which is attracted by the solenoid when the solenoid is biased. With this construction, an additive force is applied to the spring and the opening of the orifice can be adjusted by a combined action of the distinctive force of the spring plus the additive force of the actuator through the valve member in the initial period of cooling condition in accordance with the change in the temperature of the evaporator, thereby adjusting the superheat.

7 Claims, 5 Drawing Figures

EXPANSION VALVE

BACKGROUND OF THE INVENTION (1) Field of the Invention

The present invention relates to an expansion valve for cooling recycling systems for use in vehicles and the like, more particularly to an expansion valve having an actuator for imparting an additive force to the spring of the expansion valve.

(2) Description of the Prior Art

A conventional expansion valve of this kind is disclosed, for instance, in Japanese Utility Model Lying-Open Specification No. 175272/1983. FIG. 1 shows the expansion valve.

The expansion valve 1 comprises mainly a pressure chamber 2, an expansion chamber 3 and a valve body 4 consisting of a valve rod 11, a valve 12, and a spring 13. A coolant is sealed in the pressure chamber 2 and its pressure is varied. This variation is caused by temperature changes detected by a detecting rod member or a temperature/pressure converter 5 mounted at the outlet of an evaporator 22 of a cooling recycling system 21 shown in FIG. 2. The diaphragm 6 of the expansion valve 1 is operated upwards or downwards, that is, the diaphragm 6 is pushed in the upward or downward direction due to the change in pressure in the chamber 2 in accordance with the temperature detected.

The expansion chamber 3 is provided with an orifice 10 adapted to communicate with an opening 9 which in turn communicates with a primary path 7 to be connected to a compressor 23 as shown in FIG. 2, with a secondary path 8 to be connected to an evaporator 22 also shown in FIG. 2. In FIG. 2, reference numeral 24 indicates a condensor and numeral 25 indicates a liquid tank or reservoir.

The valve body 4 including the valve rod 11, the valve member 12, and the spring 13 is provided within the expansion chamber 3. One extreme end of the valve rod 11 is connected to the diaphragm 6 in the pressure chamber 2, while the other end of the rod 11 is connected to the valve member 12. The valve member 12 is supported by the upper end of the spring 13 which is in turn fixed at the bottom of the expansion chamber 3 in order to control the opening of the orifice 10 and to normally bias the valve member 12 in the direction of the arrow A in FIG. 1 to close the orifice 10.

The opening of the orifice 10 is normally adjusted at a predetermined position, that is, the closed position when the sum of the pressure of the spring 13 and the pressure in the expansion chamber 3, and the pressure in the pressure chamber 2 are balanced, and the orifice 10 is opened when the valve member 12 is moved in a opposite direction to the arrow A in FIG. 1, in accordance with the change in pressure within the pressure chamber 2. Namely, the valve rod 11 is moved downwards in accordance with the movement of the diaphragm 6 which expands in the downward direction in accordance with the pressure change in the pressure chamber 2. As a result, the valve member 12, one end of which is connected to the valve rod 11, is shifted in a direction opposite to the arrow A, against the force of the spring 13.

Accordingly, the valve member 12 cannot be opened unless a pressure larger than the pressure sum of the force of the spring 13 and the pressure in the expansion chamber 3 is applied to the upper portion of the pressure chamber 2 of the diaphragm 6. As a result, a coolant overheat condition called "superheat" is determined by the force of the spring 13 initially set up.

As described above, since the superheat is determined by the bias force of the spring 13 of the expansion valve 1 according to the prior art, the amount of the superheat tended to be normally constant.

Now, the result of experiments by the applicant shows that the superheat may be 15 degrees at the beginning of the start of cooling, while in a stable condition it may decrease to 5 degrees, as shown in FIG. 3. However, since the superheat cannot be selected to only one amount or one value in view of the relationship with the set-up value of the spring 13 as described above, the value of the stable condition of 5 degrees is normally selected. Accordingly, since the performance of the superheat in the early starting period of the operation was sacrificed, the development of an expansion valve has long been desired in which the superheat can be changed in accordance with every change in the temperature of the evaporator 22 by detecting its temperature.

SUMMARY OF THE INVENTION

It is therefore an object of the present invention to provide an expansion valve in which an actuator is provided at the spring of the expansion valve so as to adjust the bias force of the spring in response to changes in the temperature of the evaporator.

It is another object of the present invention to provide an expansion valve in which an actuator operates in response to changes in the temperature of the evaporator in the cooling operation, and the spring force can be adjusted in accordance with changes in the temperature, and wherein the opening degree of the orifice can ultimately be adjusted by a valve member coupled to the spring in accordance with the temperature change in the evaporator, so as to adjust the superheat.

It is still another object of the present invention to provide an expansion valve in which operational amplifier means and a thermistor are provided. The operational amplifier compares a reference temperature valve with the actual temperature detected by the thermistor at the evaporator and produces an output signal, so as to energize a solenoid of the actuator in accordance with the result of the comparison.

One of the features of the expansion valve according to the present invention is that it has a pressure chamber for changing its inside pressure in accordance with changes in the temperature of the evaporator, an expansion chamber provided with an orifice at a hole formed between a primary path to be connected to a compressor and a secondary path to be connected to the evaporator, and a valve member provided within the expansion chamber. The valve member is normally biased by one end of the spring in the direction of closing the orifice and is moved in the direction opening the orifice in accordance with the change in pressure in the pressure chamber. The expansion valve further comprises an actuator provided within the expansion valve and coupled to the other end of the spring so as to adjust the biased force to the spring in response to the change in the temperature of the evaporator.

Another feature of the expansion valve according to the present invention is that the actuator is comprised of a solenoid, a rod, and an action plate made of iron connected to one end of the rod, the other end of the rod being coupled to the spring, whereby when the actuator is biased, the rod imports an additive force to the force of the spring in the direction of closing the orifice, thereby adjusting the overheat degree, i.e., "superheat" by a combined action of the spring and the actuator with the range of 10 to 15 degrees.

According to the present invention, the spring of the expansion valve is provided with an actuator which operates in response to changes in the temperature of the evaporator in the cooling operation. In this expansion valve, as the bias force of the spring can be adjusted by the change in the temperature, the opening of the orifice can ultimately be adjusted by the valve member in accordance with the temperature change in the evaporator, thereby adjusting the superheat.

These and other objects, features and advantages of the present invention will be better understood from the following detailed description of the invention with reference to the accompanying drawings.

DESCRIPTION OF THE PREFERRED EMBODIMENT

Figure 1:
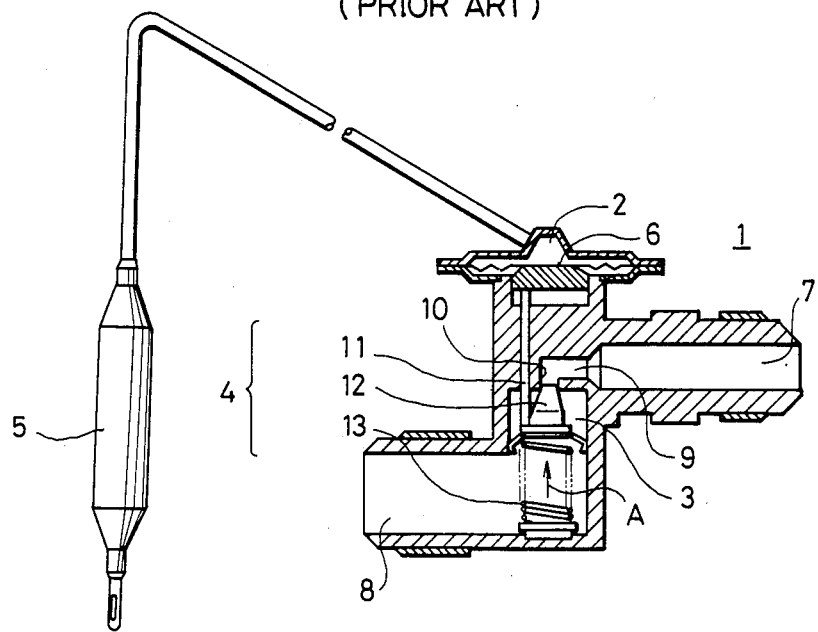
FIG. 1 is a cross-sectional view of the expansion valve according to the prior art.
Figure 2:
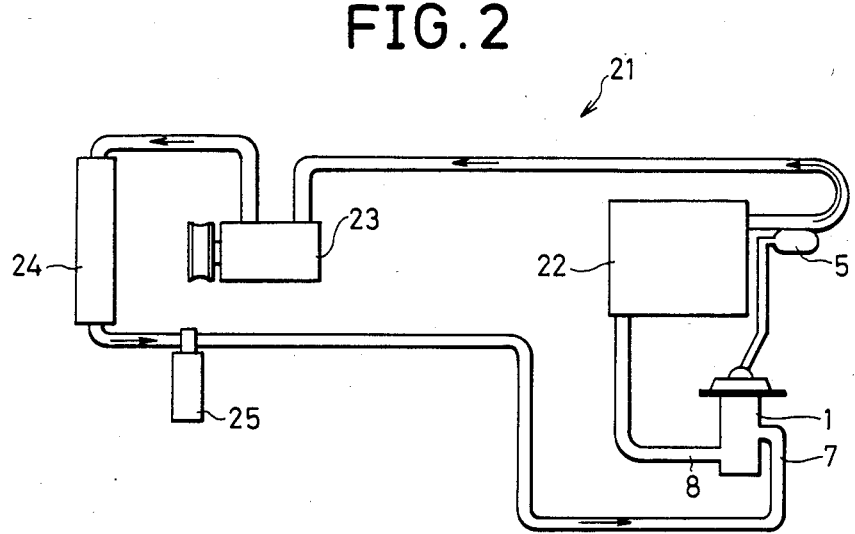
FIG. 2 is an overall coolant recycling system and shows the positional relationship of the expansion valve according to either the prior art, or the present invention.
Figure 3:
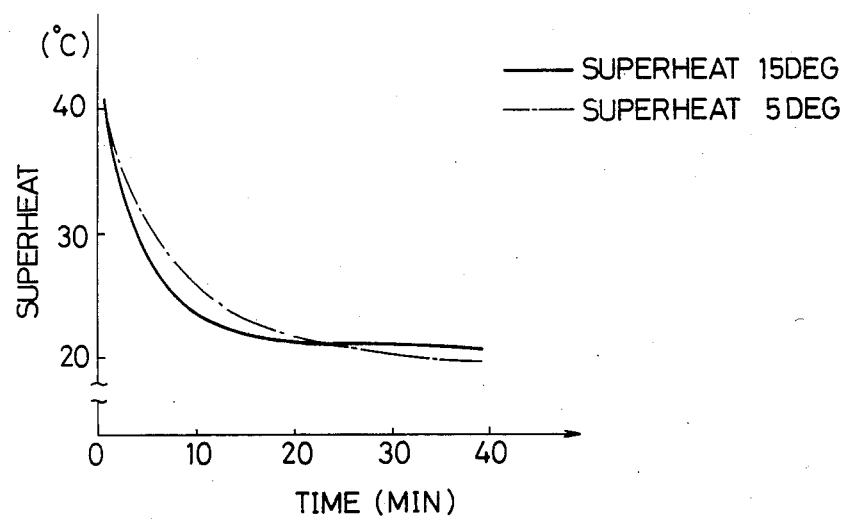
FIG. 3 shows the characteristic curves of superheat conditions during the cooling period.
Figure 4:
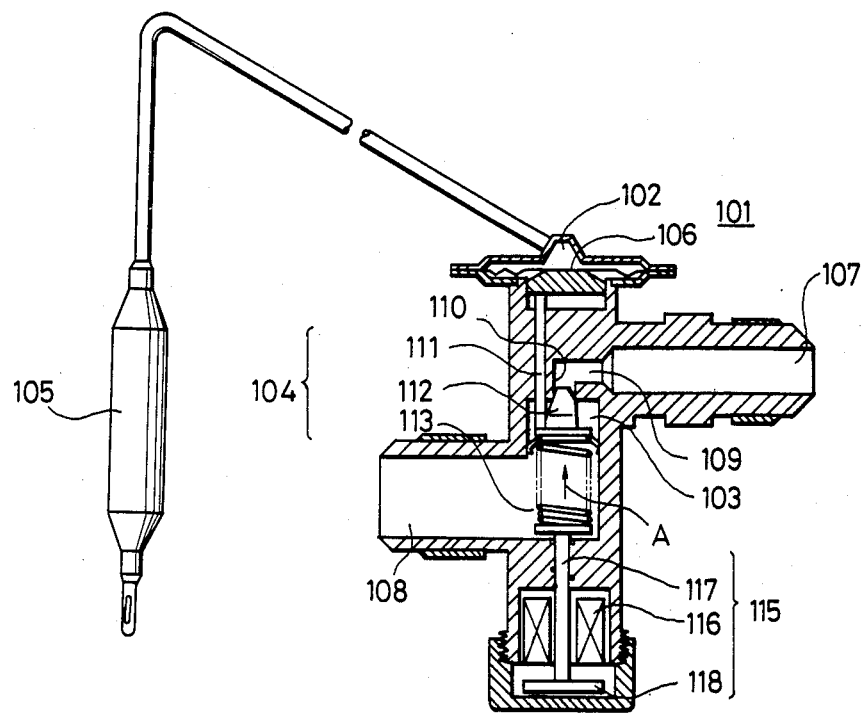
FIG. 4 is a cross-sectional view of one embodiment of the expansion valve according to the present invention.

FIG. 4 shows one embodiment of an expansion valve according to the present invention. The expansion valve 101 comprises a pressure chamber 102, an expansion chamber 103, and a valve body 104 consisting of a valve rod 111, a valve member 112, a spring 113, a temperature/pressure converter 105, a diaphragm 106, a primary path 107, a secondary path 108, a hole 109, and an orifice 110, all of which correspond to the counterpart elements shown in FIG. 1.

In addition, the expansion valve according to the present invention further comprises an actuator 115 which consists of an electromagnet or solenoid 116, a rod 117, and an action plate 118 made of iron. The rod 117 of the actuator 115 supports the spring 113 at one end thereof, while the other end of the rod 117 is connected to the action plate 118. The solenoid 116 attracts the action plate 118 when biased, and moves the rod 117 upwards so as to impart an additive force to the spring 113 of the expansion valve 101.

On the other hand, when the solenoid is not biased, the rod 117 of the actuator 115 is moved downwards by the restoring force of the spring 113 due to the release of the action plate 118.

Figure 5:
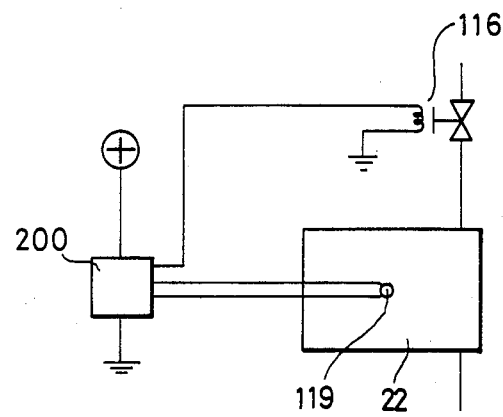
FIG. 5 shows an electrical circuit for biasing the solenoid of the actuator of FIG. 4, according to the present invention.

FIG. 5 shows an electrical circuit for operating the solenoid 116 of the actuator 115, according to the present invention. The solenoid 116 of the expansion valve 101 is connected to one input of an operational amplifier 200. To the amplifier 200, there is also connected a thermister 119 which is mounted at the evaporator 22. The solenoid 116 is operated by an output signal from the operational amplifier 200 having a comparison function between a preset valve or reference temperature valve and the detected temperature from the thermister 119. Namely, when actual temperature is detected by the thermistor 119 which is mounted at the evaporator 22 at a certain time point, a signal corresponding to the actual temperature detected is applied to the operational amplifier 200 and it is compared with a predetermined valve reference temperature stored within the amplifier 200. For example, when the actual temperature detected by the thermistor 119 exceeds the predetermined value of the reference temperature, e.g., 5° C., the operational amplifier 200 conducts and produces an electrical control signal to be applied to the solenoid 116 for engergization.

With this construction, when the solenoid 116 is biased by the control signal from the amplifier 200, the action plate 118 is attracted by the solenoid 116 because of its magnetization. As a result, the rod 117 is moved upward, i.e., in the direction of the arrow A in FIG. 4, and the pushing force of the spring 113 to the valve member 112 is increased as the bottom portion of the spring 113 is coupled to the rod 117 of the actuator 115.

On the other hand, when the actual temperature detected by the thermistor 119 at the evaporator 22 is, for instance, below 5° C., the operational amplifier 200 is no longer rendered conductive and no output signal is produced therefrom. As a result, the solenoid 116 is not biased and the action plate 118 not attracted by the solenoid 116. Consequently, the rod 117 is returned to the original position by the bias force or restoring force of the spring 113, i.e., the rod 117 is moved in the opposite direction to the arrow A. Accordingly, the valve member 112 coupled to one end of the spring 113 opens or closes the orifice 110 in accordance with the bias force of the spring preliminarily set up when no additive forced is exerted on the spring 113 through the rod 117 because of the release of the solenoid 116 of the actuator 115.

In the initial period of the cooling operation, the temperature in the evaporator 22 is normally high. Accordingly, the operational amplifier 200 compares the reference temperature of, say 5° C. with the actual temperature of the evaporator 22, detected by the thermistor 119. If the detected temperature is above the reference or predetermined temperature of 5° C., the operational amplifier 200 produces the electrical signal to the solenoid 116. As a result, the action plate 118 is attracted by the solenoid 116, so that the rod 117 pushes the spring 113 in the upward direction and the valve member 112 moves in a direction so as to close the orifice 110, i.e., in the direction of the arrow A, thus enabling the overheat degree to be high, i.e., the superheat to be high, for instance, 10 to 15 degrees.

When the operation enters into the stable time period of the cooling operation, the temperature in the evaporator 22 is lowered. As a result, the operational amplifier 200 now compares the actual temperature detected by the thermistor 119 with the predetermined temperature of, e.g., 5° C. If the detected temperature is below the predetermined valve of 5° C., the amplifier 200 does not produce the output signal to the solenoid 116. Accordingly, the solenoid is not be biased and the action plate 118 is not attracted by the solenoid 116, so that the action plate 118 is returned to the original position by the restoring force of the spring 113. Consequently, the valve member 112 is now moved downward in FIG. 4, i.e., in the opposite direction of the arrow A, and the valve member 112 now opens the orifice 110, thereby enabling the superheat to be set up at 5 degrees.

As described in the foregoing embodiment according to the present invention, there is provided an actuator having a solenoid, a rod, and an action plate, in which one end of the rod is connected to the spring of the expansion valve and the other end of the rod is connected to the action plate. Accordingly, when the temperature of the evaporator becomes high at the beginning of the cooling operation, the actuator is operated. As a result, the bias force of the spring exerted on the valve member can be additively increased, and the valve member, due to the strong force of the spring, is moved in a direction such as to close the orifice.

On the other hand, in the stable condition of the cooling operation, the bias force of the actuator is released and the opening of the orifice is controlled only by the restoring force of the spring. As a result, the superheat can be changed between the initial period and the stable period of the cooling operation, thus realizing an expansion valve having compatible cooling performances between the initial period and the stable period of the cooling operation.

Moreover, the superheat can be set up in accordance with the temperature change in the evaporator.

As described in the foregoing embodiment, since the spring in the expansion valve is provided with an actuator which operates in response to change in the temperature of the evaporator in the cooling operation, and the spring force can be adjusted in accordance with the change in the temperature, the opening of the orifice can ultimately be adjusted in accordance with the temperature change in the evaporator, thereby adjusting the superheat.

While the invention has been described in its preferred embodiment, it is to be understood that the words which have been used are words of description rather than limitation and that various changes and modification may be made within the purview of the appended claim without departing from the true scope and spirit of the invention in its broader aspects.

What is claimed is:

1. An expansion valve for use in a cooling recycling system for use in vehicles and the like and including a compressor and an evaporator, comprising:
    (a) a valve body defining an expansion chamber adapted to communicate with a first path to such compressor and a second path to such evaporator;
    (b) an orifice formed at the top of said expansion chamber;
    (c) a valve member mounted in said expansion chamber, and spring means having an upper end engaging and biasing said valve member in the direction of said orifice for closing the same;
    (d) a pressure chamber associated with said valve body, said pressure chamber containing a coolant, the pressure in said chamber being variable in accordance with the temperature in the evaporator, and means operatively connected between said pressure chamber and said valve member for moving said valve downwardly to open said orifice when pressure in said pressure chamber exceeds the pressure in said expansion chamber;
    (e) actuator means mounted in said valve housing and coupled to the lower end of said spring means for adjusting the biasing force of said spring means, said actuator means comprising a solenoid, an action plate, and a rod actuatable by said solenoid, said rod being connected at one end to said spring means and at its other end to said action plate; and
    (f) means for actuating said solenoid dependent on the temperature of the evaporator,
    whereby the rod is raised to impart an additive force to said spring means in the direction of closing said orifice.

2. The expansion valve as claimed in claim 1, wherein said expansion valve further comprises an operational amplifier means and a thermistor mounted adjacent the evaporator to apply an electrical signal corresponding to the temperature of said evaporator, said operational amplifier means comparing the actual temperature detected by said thermistor with a preset temperature value and producing an output signal so as to energize said solenoid when a predetermined temperature differential exists.

3. An expansion valve as claimed in claim 2, wherein said preset temperature value is 5° C.

4. An expansion valve as claimed in claim 1, wherein the superheat temperature of the coolant can be adjusted by a combined action of said spring means and said actuator means within the range of 10 to 30 degrees.

5. An expansion valve for use in a cooling recycling system for use in vehicles and the like and including a compressor and an evaporator, comprising:
    (a) a valve body defining an expansion chamber adapted to communicate with a first path to such compressor and a second path to such evaporator;
    (b) an orifice formed at the top of said expansion chamber;
    (c) a valve member mounted in said expansion chamber, and spring means having an upper end engaging and biasing said valve member in the direction of said orifice for closing the same;
    (d) a pressure chamber associated with said valve body, said pressure chamber containing a coolant, the pressure in said chamber being variable in accordance with the temperature in the evaporator, and means operatively connected between said pressure chamber and said valve member for moving said valve downwardly to open said orifice when pressure in said pressure chamber exceeds the pressure in said expansion chamber;
    (e) actuator means mounted in said valve housing and coupled to the lower end of said spring means for adjusting the biasing force of said spring means; and
    (f) means for energizing said actuator means dependent on the temperature of the evaporator,
    whereby said actuator means imparts an additive force to said spring means in the direction of closing said orifice when the temperature of the evaporator is over a predetermined temperature value.

6. The expansion valve set forth in claim 5, wherein said pressure chamber is connected with a temperature/pressure converter located at the outlet side of the evaporator.

7. The expansion valve set forth in claim 5, wherein said actuator means comprises a solenoid, a rod, and an action plate connected to one end of said rod, the other end of said rod being coupled to said spring means, whereby when said solenoid is energized, said rod imparts an additive force to the spring in the direction of the closing of the orifice.

* * * * *